United States Patent
Robertson

(10) Patent No.: US 6,873,468 B1
(45) Date of Patent: Mar. 29, 2005

(54) APPARATUS FOR LENGTHENING THE PATH OF A LIGHT BEAM

(75) Inventor: Richard L. Robertson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 633 days.

(21) Appl. No.: 09/595,192

(22) Filed: Jun. 16, 2000

(51) Int. Cl.[7] .................. G02B 27/14; G02B 5/08; G02B 7/18
(52) U.S. Cl. ............. 359/629; 359/861; 359/637
(58) Field of Search .................. 359/850, 851, 359/857, 861, 866, 592, 595, 630, 637, 629

(56) References Cited

U.S. PATENT DOCUMENTS

| | | | | |
|---|---|---|---|---|
| 3,669,545 A | * | 6/1972 | Gilbly | 356/320 |
| 4,385,237 A | * | 5/1983 | Drukaroff et al. | 359/860 |
| 5,453,877 A | * | 9/1995 | Gerbe et al. | 359/633 |
| 6,003,997 A | * | 12/1999 | Downes, Jr. | 359/861 |
| 6,199,990 B1 | * | 3/2001 | Chee et al. | 359/850 |

* cited by examiner

Primary Examiner—Georgia Epps
Assistant Examiner—Alicia Harrington
(74) Attorney, Agent, or Firm—Nathan O. Jensen; Kyle Eppele

(57) ABSTRACT

The invention is an apparatus for lengthening the path of a light beam. The apparatus includes an at least partially enclosed chamber having a first opening and a second opening. A first reflective surface is disposed within the chamber and is obliquely oriented with respect to an incoming path of the beam. The beam reflects off of the first reflective surface after the beam enters the chamber through the first opening. Second and third reflective surfaces are disposed within the chamber and are generally parallel to the incoming path of the beam. The beam is reflected a plurality of times between the second and third reflective surfaces after the beam is reflected by the first reflective surface. A fourth reflective surface is disposed within the chamber and is obliquely oriented with respect to the incoming path of the beam. The fourth reflective surface directs the beam through the second opening after the beam has been reflected a plurality of times between the second and third reflective surfaces. The apparatus may be used for amplifying the lateral deflection of a laser beam in an optical analog-to-digital converter.

19 Claims, 3 Drawing Sheets

APPARATUS FOR LENGTHENING THE PATH OF A LIGHT BEAM

FIELD OF THE INVENTION

The present invention relates to optics, and more particularly, to optical analog-to-digital converters.

BACKGROUND OF THE INVENTION

Analog-to-digital converters (ADC's) are vital for effective signal processing. Known ADC's use electrical or radio frequency-based technology, but rapid advances in technology that require greater processing speeds, increased channel bandwidths and improved transmission reliability, have resulted in a steadily growing focus on the optical domain and the vast potential therein. Optical ADC's are relatively new when compared to electrical and radio frequency (RF)-based processing.

One approach to perform rapid optical analog-to-digital conversion is by angular deflection of a laser beam. In such a system, a laser generates a beam of light in response to an input analog signal. The intensity of the beam depends on the analog input signal. The beam is deflected by an intensity-discriminating material, such as a silicon prism. The index of refraction of the silicon prism is modified in accordance with the intensity of the beam. Because the beam intensity varies as the analog input signal varies, the beam is deflected by the prism over a range of angles. A plurality of light detectors are positioned to detect the deflected beam and provide a digital output signal. If two light detectors are used, for example, the intensity-discriminating material deflects the beam toward one of the two light detectors based upon the intensity of the beam. In this manner, a digital signal can be created from an analog signal.

For some optical ADC designs, the angular deflection through the intensity-discriminating material may be small. If the beam is not sufficiently deflected by the intensity-discriminating material, it may not be possible to variably direct the beam toward a sufficient number of light detectors to create a desired digital signal. Extending the path length of the deflected beam will compensate for the small angle of deflection and will achieve a lateral deflection of the beam that is sufficient to be used with the plurality of light detectors. Due to design considerations, however, it may not be possible to lengthen the path length as much as is necessary. For example, some applications may limit the space available for an ADC, and a long path length may not fit within the given space requirements. A custom optical lens design could be used to partially shorten the required path length, but this could add considerable cost and complexity to an ADC design. Furthermore, in applications such as avionics where space is at a premium, such a lens design would not completely resolve the issue of a long path length requirement.

It is therefore an object of the invention to lengthen the path of a light beam, such as a laser beam, in a relatively compact space.

It is another object of the invention to provide a beam-lengthening apparatus that is compact enough to be used in space-critical applications such as avionics.

It is another object of the invention to provide a beam-lengthening apparatus that is simple and inexpensive to manufacture.

A feature of the invention is an apparatus having a plurality of reflective surfaces disposed within an at least partially enclosed chamber and arranged so that a light beam directed into the chamber reflects a plurality of times between the reflective surfaces before emerging from the chamber.

An advantage of the invention is a simple and inexpensively manufactured beam path lengthener that is compact enough to be used as part of an optical analog-to-digital converter in avionics and other space-critical applications.

SUMMARY OF THE INVENTION

The invention is an apparatus for lengthening the path of a light beam. The apparatus includes an at least partially enclosed chamber having a first opening and a second opening. A first reflective surface is disposed within the chamber and is obliquely oriented with respect to an incoming path of the beam. The beam reflects off of the first reflective surface after the beam enters the chamber through the first opening. Second and third reflective surfaces are disposed within the chamber and are generally parallel to the incoming path of the beam. The beam is reflected a plurality of times between the second and third reflective surfaces after the beam is reflected by the first reflective surface. A fourth reflective surface is disposed within the chamber and is obliquely oriented with respect to the incoming path of the beam. The fourth reflective surface directs the beam through the second opening after the beam has been reflected a plurality of times between the second and third reflective surfaces.

The invention also provides an apparatus for increasing a lateral deflection of a light beam in an optical analog-to-digital converter. The apparatus includes a first reflector that alters the direction of the light beam from an input direction, and second and third reflectors that are disposed such that neither the second reflector nor the third reflector is parallel to the first reflector. The second and third reflectors are positioned to reflect the light beam a plurality of times therebetween along a first path after the first reflector has reflected the light beam. A fourth reflector may be disposed along the first path and reflects the light beam after the light beam has been reflected a plurality of times between the second and third reflectors. The fourth reflector directs the light beam in an output direction.

The invention further provides a method of lengthening a path of a light beam. The direction of the light beam is altered from a first path by a first reflective surface. The light beam is reflected a plurality of times between second and third reflective surfaces. The light beam is then redirected by a fourth reflective surface to a second path.

DETAILED DESCRIPTION OF THE DRAWINGS

Figure 1:
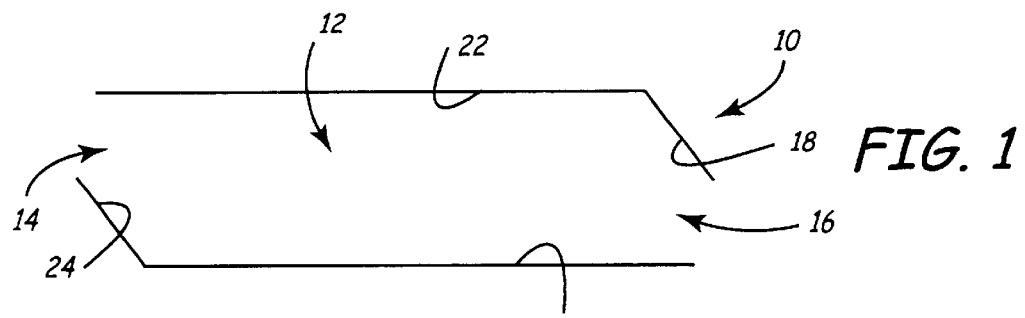
FIG. 1 is a side elevational view of the interior of a beam path expander according to an embodiment of the invention.
Figure 2:
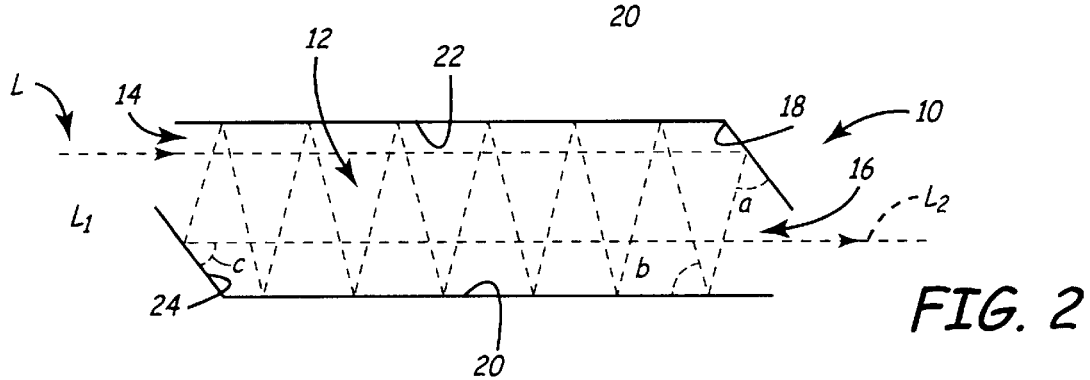
FIG. 2 is a side elevational view of the interior of the beam path expander of FIG. 1 showing a path of a light beam therein.

FIGS. 1 and 2 depict a beam path expander 10 according to an embodiment of the invention. Expander 10 includes a plurality of reflective surfaces that together define an at least partially enclosed chamber 12. A first opening 14 permits a light beam L (FIG. 2) to enter chamber 12, and a second opening 16 permits the light beam to exit the chamber. A first reflective surface 18 is disposed adjacent second opening 16 and is positioned at an oblique angle with respect to the incoming path $L_i$ of light beam L. Second and third reflective surfaces 20, 22 are depicted in FIG. 2 as being substantially parallel to incoming path $L_1$ of light beam L. A fourth reflective surface 24 is disposed adjacent first opening 14 and is disposed at an oblique angle with respect to incoming path $L_1$. Reflective surfaces 18, 20, 22, 24 are comprised of substantially planar elements that have a highly reflective coating placed thereon. Alternately, the reflective surfaces may comprise highly polished surfaces of the substantially planar elements.

Figure 3:
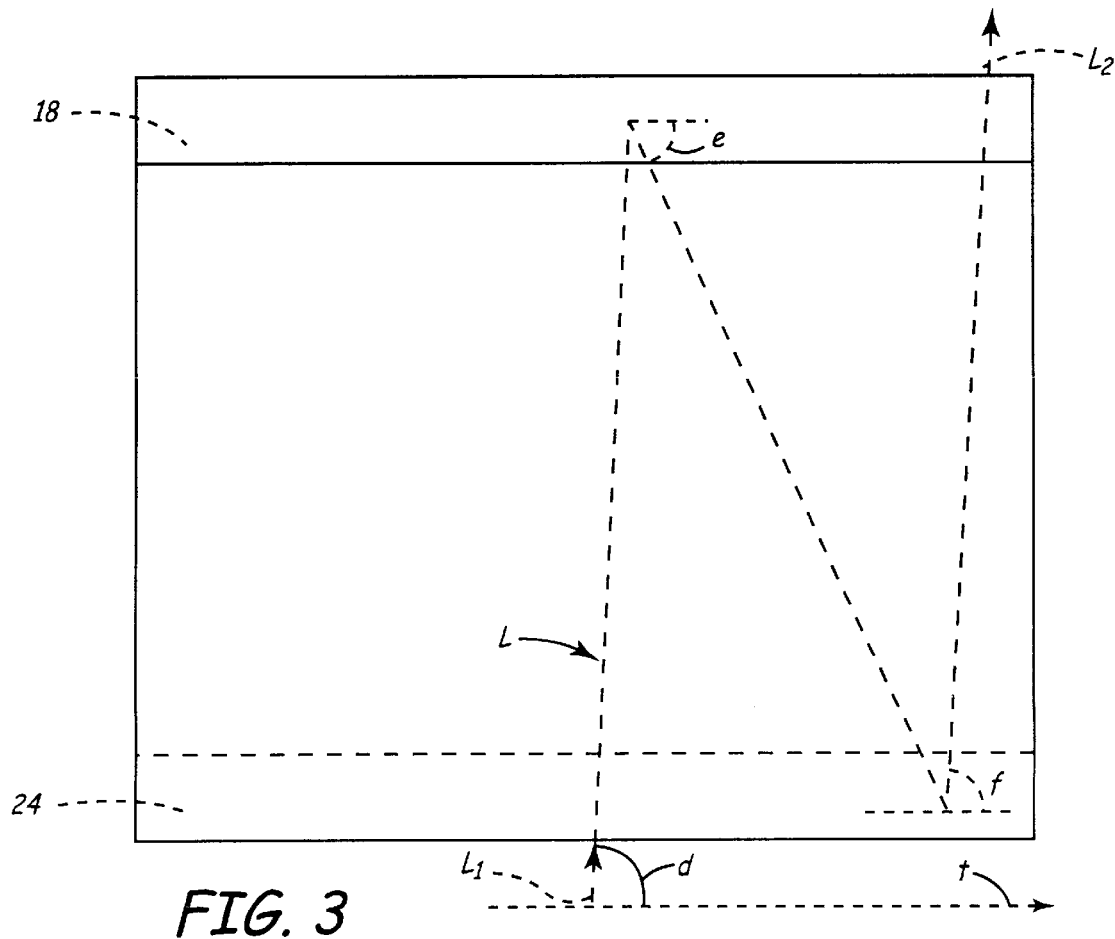
FIG. 3 is a top plan view of the interior of the beam path expander of FIG. 1 showing a path of a light beam therein.

In operation (FIG. 2), light beam L, which may be laser light, enters chamber 12 through first opening 14. The light beam is reflected off of first reflective surface 18 at an angle a toward second reflective surface 20. The light beam is then reflected a plurality of times at an angle b between second and third reflective surfaces 20, 22 as it travels toward fourth reflective surface 24. The light beam reflects off of fourth reflective surface 24 at an angle c such that the light beam travels toward second opening 16. The light beam exits chamber 12 along an outgoing path $L_2$ through second opening 16. FIG. 3, which is a top view of chamber 12, shows that the light beam, entering chamber 12 at an angle d in the horizontal plane, is laterally reflected off of first and fourth reflective surfaces 18, 24 at angles e and f, respectively, to thereby laterally deflect the light beam in a direction t.

It can be seen from FIGS. 2 and 3 that the path of a light beam is substantially lengthened by beam path expander 10. For instance, if first and second openings 14, 16 are five inches apart and second and third reflective surfaces 20, 22 are two inches apart, a total path length of 50 inches can be realized. This is a tenfold increase in path length when compared to the five inches the light beam would travel without beam path expander 10 present. The tenfold increase in path length also provides a proportionate increase of the range that the light beam may be laterally deflected in direction t. To illustrate, an optical system yielding a 0.25 inch lateral deflection range for a path length of five inches would therefore have an lateral deflection range of 2.5 inches using beam path expander 10. Beam path expander may therefore be advantageously used in an optical ADC to amplify the lateral deflection of the light beam and therefore compensate for an otherwise small angular deflection of the light beam by the optical ADC. This permits the optical ADC to more effectively process an analog signal into a digital signal.

Figure 4:
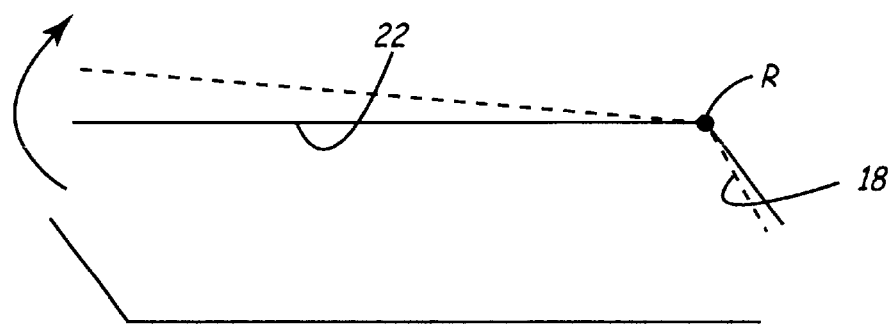
FIG. 4 is a side elevational view of a beam path expander according to another embodiment of the invention.

Other path lengths and lateral deflection ranges may be realized by varying the distance between second and third reflective surfaces 20, 22, the distance between first and fourth reflective surfaces 18, 24, or by arranging any or all of the reflective surfaces to change angles a, b, or c. Such adjustments may also be made to ensure that light beam L at second opening 16 is parallel to the light beam at first opening 14. For instance, the beam path expander may be angularly adjusted as shown in FIG. 4, in which first and third reflective surfaces 18, 22 are rotated about point R. Such an adjustment would vary angles a, b and c.

Figure 5:
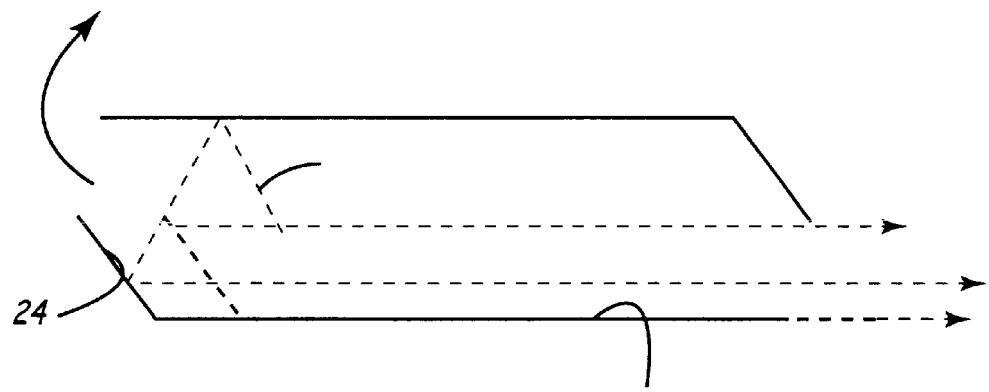
FIG. 5 is a side elevational view of a beam path expander according to another embodiment of the invention.
Figure 6:
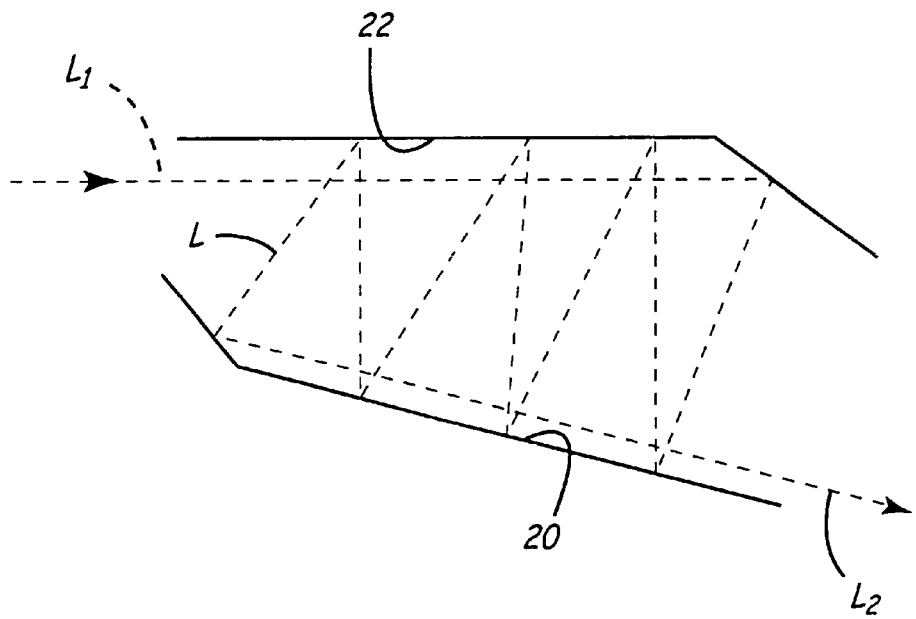
FIG. 6 is a side elevational view of a beam path expander according to still another embodiment of the invention.
Figure 7:
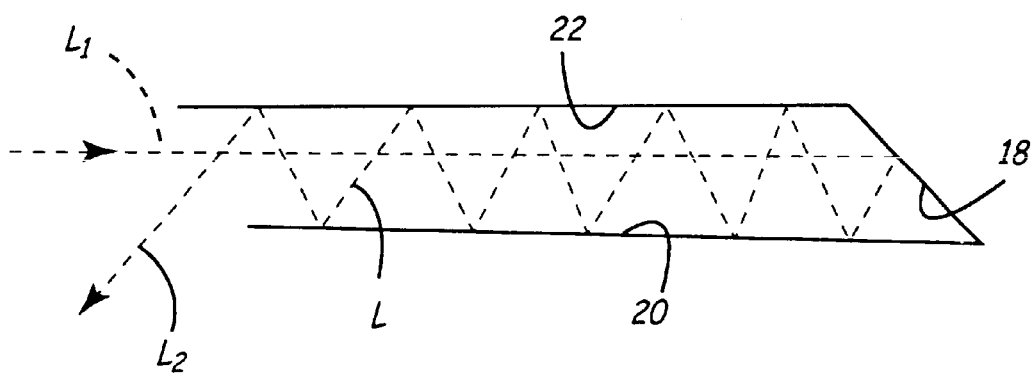
FIG. 7 is a side elevational view of a beam path expander according to yet another embodiment of the invention.

Alternately, as shown in FIG. 5, second and fourth reflective surfaces 20, 24 may be moved with respect to first and third reflective surfaces 18, 22 such that the second and third reflective surfaces remain parallel to each other. Such a translation would vary the location that light beam L strikes fourth reflective surface 24, and consequently the height of the light beam is also varied. FIG. 6 shows another embodiment of the invention in which second and third reflective surfaces 20, 22 are not parallel to each other. Such a design may cause outgoing path $L_2$ to not be parallel to incoming path $L_1$. FIG. 7 shows yet another embodiment of the invention in which only first, second and third reflective surfaces 18, 20, 22 are used. Both incoming path $L_1$ and outgoing path $L_2$ of light beam L pass through first opening. However, outgoing path $L_2$ is not parallel to incoming path $L_1$, as is the case with some of the previous embodiments. If in the embodiment shown in FIG. 7 it is desired for outgoing path $L_2$ to be parallel to incoming path $L_1$, one or more additional reflectors may be positioned to reflect light beam L accordingly. These and other variations are considered to be within the scope of the invention.

An advantage of the invention is that a substantial lateral deflection of a light beam, such as a laser, may be realized in a relatively small space. As previously stated, this has particular advantage in an optical ADC that provides a relatively small angular deflection of the laser. The invention therefore increases the effectiveness of optical ADC's.

Another advantage of the invention is that such an angular deflection is realized using a low-cost, adjustable mechanism.

Still another advantage is that the expander may be adjusted to vary the length, direction and position of the light beam.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An apparatus for lengthening the path of a light beam, comprising:
    an at least partially enclosed chamber having a first opening and a second opening;
    a first reflective surface disposed within the chamber and obliquely oriented with respect to an incoming path of the beam, wherein the beam reflects off of the first reflective surface after the beam enters the chamber through the first opening;

second and third reflective surfaces disposed within the chamber, the second and third reflective surfaces being generally parallel to the incoming path of the beam, wherein the beam is reflected a plurality of times between the second and third reflective surfaces after the beam is reflected by the first reflective surface; and a fourth reflective surface disposed within the chamber and obliquely oriented with respect to the incoming path of the beam, wherein the beam reflects off of the fourth reflective surface toward and through the second opening after the beam has been reflected a plurality of times between the second and third reflective surfaces.

2. The apparatus of claim 1, wherein the first opening is disposed adjacent the third and fourth reflective surfaces.

3. The apparatus of claim 2, wherein the second opening is disposed adjacent the first and second reflective surfaces.

4. The apparatus of claim 1, wherein the fourth reflective surface is translatable relative to the first reflective surface.

5. The apparatus of claim 1, wherein at least one of the first and third reflective surfaces is rotatable relative to the second and fourth reflective surfaces.

6. The apparatus of claim 1, wherein the path of the beam as it exits the second opening is an outgoing path, and wherein the first, second, third and fourth reflective surfaces are positioned such that the incoming path of the beam is substantially parallel to the outgoing path of the beam.

7. The apparatus of claim 1, wherein the light beam is a laser beam.

8. The apparatus of claim 1, wherein the first and second reflective surfaces are positioned such that the beam reflects off of the first reflective surface toward the second reflective surface.

9. An apparatus for increasing a lateral deflection of a light beam in an optical analog to digital converter, comprising:

a first reflector that alters the direction of the light beam from an input direction;

second and third reflectors disposed such that neither the second reflector nor the third reflector is parallel to the first reflector, the second and third reflectors being positioned to reflect the light beam a plurality of times therebetween along a first path after the light beam has been reflected by the first reflector; and a fourth reflector that is disposed along the first path, the fourth reflector reflecting the light beam in an output direction after the light beam has been reflected a plurality of times between the second and third reflectors, wherein the fourth reflector is translatable relative to the first reflector.

10. The apparatus of claim 9, wherein at least one of the first and third reflectors is rotatable relative to the second and fourth reflectors.

11. The apparatus of apparatus of claim 9, wherein the second and third reflectors are generally parallel to each other.

12. The apparatus of claim 9, wherein the output direction is substantially parallel to the input direction.

13. The apparatus of claim 9, wherein the first, second, third and fourth reflectors define an at least partially enclosed chamber.

14. The apparatus of claim 9, wherein the light beam is a laser beam.

15. An apparatus for increasing a lateral deflection of a light beam in an optical analog-to-digital converter, comprising:

a first reflector that alters the direction of the light beam from an input direction;

second and third reflectors disposed such that neither the second reflector nor the third reflector is parallel to the first reflector, the second and third reflectors being positioned to reflect the light beam a plurality of times therebetween along a first path after the light beam has been reflected by the first reflector; and a fourth reflector that is disposed along the first path, the fourth reflector reflecting the light beam in an output direction after the light beam has been reflected a plurality of times between the second and third reflectors, wherein at least one of the first and-third reflectors is rotatable relative to the second and fourth reflectors.

16. The apparatus of claim 15, wherein the second and third reflectors are generally parallel to each other.

17. The apparatus of claim 15, wherein the output direction is substantially parallel to the input direction.

18. The apparatus of claim 15, wherein the first, second, third and fourth reflectors define an at least partially enclosed chamber.

19. The apparatus of claim 15, wherein the light beam is a laser beam.

* * * * *